(12) United States Patent
Park

(10) Patent No.: US 6,628,949 B1
(45) Date of Patent: Sep. 30, 2003

(54) METHOD OF PRIORITIZING HANDOFF REQUESTS IN MOBILE COMMUNICATION SYSTEM

(75) Inventor: Jin-Soo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/365,958

(22) Filed: Aug. 2, 1999

(30) Foreign Application Priority Data

Jul. 31, 1998 (KR) ........................................ 1998-31224

(51) Int. Cl.[7] ................................................. H04Q 7/38
(52) U.S. Cl. ........................................ 455/436; 455/438
(58) Field of Search ................................ 455/436, 438, 455/439, 450, 453, 509, 510, 512, 513; 370/331, 468

(56) References Cited

U.S. PATENT DOCUMENTS

| 5,465,389 A | * | 11/1995 | Agrawal et al. | ............ 455/33.2 |
| 5,615,249 A | * | 3/1997 | Solondz | ...................... 455/33.1 |
| 5,923,650 A | * | 7/1999 | Chen et al. | .................. 370/331 |

* cited by examiner

Primary Examiner—Lee Nguyen
(74) Attorney, Agent, or Firm—Dilworth & Barrese, LLP

(57) ABSTRACT

A method of prioritizing handoff requests which are waiting in a queue to be assigned a channel in a mobile communication system. According to an embodiment of the present invention, when there are a plurality of queued handoff requests, the handoff requests are prioritized based on the channel capacity, service type, and cutoff time of the call, and a free channel is assigned to the handoff request with the highest priority.

18 Claims, 4 Drawing Sheets

METHOD OF PRIORITIZING HANDOFF REQUESTS IN MOBILE COMMUNICATION SYSTEM

PRIORITY

This application makes reference to, incorporates the same herein, and claims all benefits accruing under 35 U.S.C. §119 from an application entitled METHOD OF PRIORITIZING HANDOFF REQUESTS IN MOBILE COMMUNICATION SYSTEM earlier filed in the Korean Industrial Property Office on Jul. 31, 1998, and there duly assigned Serial No. 98-31224.

BACKGROUND OF THE INVENTION

1. Field of the Invention

The present invention relates to a method of assigning a channel for a handoff in a mobile communication system, and more particularly, to a method of prioritizing handoff requests in a mobile communication system in order to assign free channels to queued handoff requests based on their priorities.

2. Description of the Related Art

In a mobile communication system, handoff is the procedure by which a call is switched to a new communication channel while a user is talking. Communication channel switching may be implemented within a particular cell at one base station or between different cells. During an inter-cell handoff, how to assign the limited number of available channels in each cell is a very significant consideration. The channels can be assigned by prioritizing handoff calls. More specifically, when there are no available channels in a base station associated with a corresponding cell, mobile handoff requests are prioritized and queued. Then, if there is a free channel, the free channel is assigned to the handoff call with the highest priority. A typical channel assignment procedure for handoff in a mobile communication system is depicted in FIGS. 1 and 2.

FIG. 1 is a block diagram of a base station 100 in a cell, which receives channel assignment requests from a plurality of mobile stations 105a, 105b, and 105c located within a handoff region.

Each mobile station 105a, 105b, and 105c sends an RF (Radio Frequency) signal, requesting a new channel assignment. Included in the RF signal is data indicative of the power level detected by the mobile station. Each mobile station 105a, 105b, and 105c samples the transmitted power level on a periodic basis and sends them to the base station 100. The base station 100 receives the sampled power level readings through an antenna 130 and computes the rate of change of power level for the corresponding mobile station.

A demodulator 135 converts the received RF signal to digital data. The digital data includes voice and control data. A processor 140 receives the digital data and extracts the power level data from the voice and control data. The power level data is stored in a memory 145. The voice data is transmitted to a mobile telephone switching office (MTSO) 150 which determines the destination of the data. The processor 140 retrieves the power level data for a particular mobile station and determines from it the cutoff time at which the mobile station will leave the handoff region 120. Cutoff times are used to determine handoff priorities. For example, mobile stations having smaller cutoff times are assigned higher priority than mobile stations having larger cutoff times. Available channels are assigned to handoff requests based on their priorities within a queue in which the handoff requests are arranged according to their cutoff times. These assignments are communicated to the mobile stations using a modulator 170 and an antenna 165.

FIG. 2 is a flowchart depicting a general handoff call process in a base station upon channel assignment requests from mobile stations. Referring to FIGS. 1 and 2, the foregoing will be described in more detail.

Upon receipt of a channel assignment request from a mobile station (step 201), the processor 140 of the base station 100 then determines whether the call is a new call or a handoff call (step 203). If the call is a new call, the base station 100 determines whether any of its channels are free (step 205). If a free channel exists, the mobile station is assigned the channel (step 209). If no channels are free, the processor 140 rejects the call (step 207). If a handoff is requested (step 203), the base station 100 again determines whether any of its channels are free (step 211). If a channel is free, the mobile station is assigned the channel (step 209). If no channels are available, the handoff request is placed in a queue (step 213). If multiple handoff requests exist (step 215), they are prioritized (step 217). A determination is made whether any of the mobile stations requesting a handoff have left the handoff region 20 of FIG. 1 (step 219). If the mobile station has left the handoff region 120 and has not been assigned a new channel by the base station 100, the call is aborted (step 221). Once a channel is available (step 223), the channel is assigned to the queued handoff request having the highest priority (step 225).

However, since the movement of the mobile stations requesting a handoff cannot be accurately predicted, it is also impossible to exactly determine which handoff call will be first cut off. Yet the determination can be made with a relatively high accuracy by estimating the cutoff time of each call. The power level of the currently serving base station measured at the mobile station and the rate of change of the power level is used to make such an estimation. The power level is a significant factor which determines a cell boundary and defines a handoff region. From here the term 'cutoff time' is used to refer to the estimated cutoff time.

FIG. 3 is a flowchart depicting a conventional method of prioritizing handoff requests in step 217 of FIG. 2.

Referring to FIG. 3, the minimum cutoff time $MIN_t$ is set to an initial value which is typically infinity (step 301). Next, the base station 100 selects one of the queued handoff requests for which the cutoff time will be determined (step 303). The cutoff time for a particular mobile station i is determined by $$T(i) = (P_{min} - P_t(i))/R \qquad (1)$$

where $T(i)$ is the cutoff time for a mobile station i; $P_{min}$ is the cutoff threshold power, $P_t(i)$ is the current power level detected by the mobile station i and transmitted to a base station, and R is the rate of change of power level for the mobile station i, given by $$dP_t(i)/dt \qquad (2)$$

The processor 140 retrieves the cutoff threshold power $P_{min}$, the current power level $P_t(i)$, and the rate of change of power level R for the selected handoff request from the memory 145 (step 305). Then, the processor 140 calculates the cutoff time T(i) using Eq.1 (step 307). The processor 140 compares T(i) with $MIN_t$ (step 309). If $T(i)<MIN_t$, $MIN_t$ is set to T(i) (step 311). Otherwise, it is determined whether there are any other queued handoff requests (step 313). If there are additional queued handoff requests, steps 303–311 are repeated. If there are no additional queued handoff requests, the processor 140 sets the handoff call of the mobile station having the most critical state to the highest priority (step 315). This corresponds to the mobile station i with T(i)=MIN$_t$. This means that the highest priority is given to a handoff call having the smallest cutoff time among queued handoff requests and when a channel becomes available, the mobile station is assigned the channel.

The conventional method of prioritizing handoff requests is based on the assumption that all handoff calls need channels of the same capacity. Yet the channel capacities may vary in actual situations. For example, in areas where radio multimedia service is supported, it may be more appropriate to change the priority of a handoff according to service type. Therefore, there is a need for a new channel assignment scheme in which required channel capacity and service type are taken into account.

SUMMARY OF THE INVENTION

An object of the present invention is to provide a method of prioritizing handoff requests in a mobile communication system supporting a multimedia service.

According to an embodiment of the present invention, when there are a plurality of queued handoff requests, the handoff requests are prioritized based on the channel capacity, service type, and cutoff time of the call, and the next free channel is assigned to the handoff request with the highest priority.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

Figure 1:
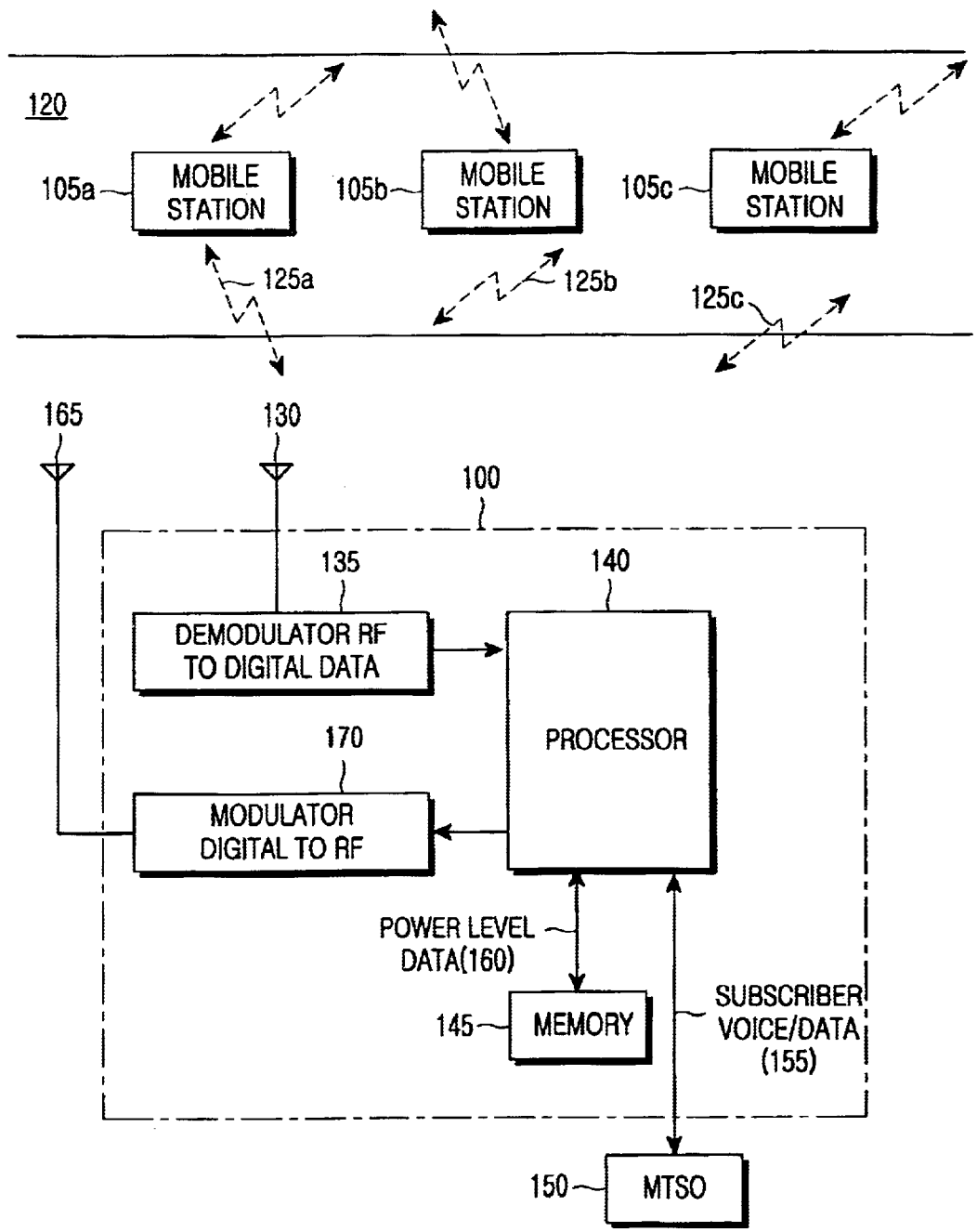
FIG. 1 is an illustrative diagram of a typical cellular system with a base station and a plurality of mobile stations located in a handoff region of a cell.
Figure 2:
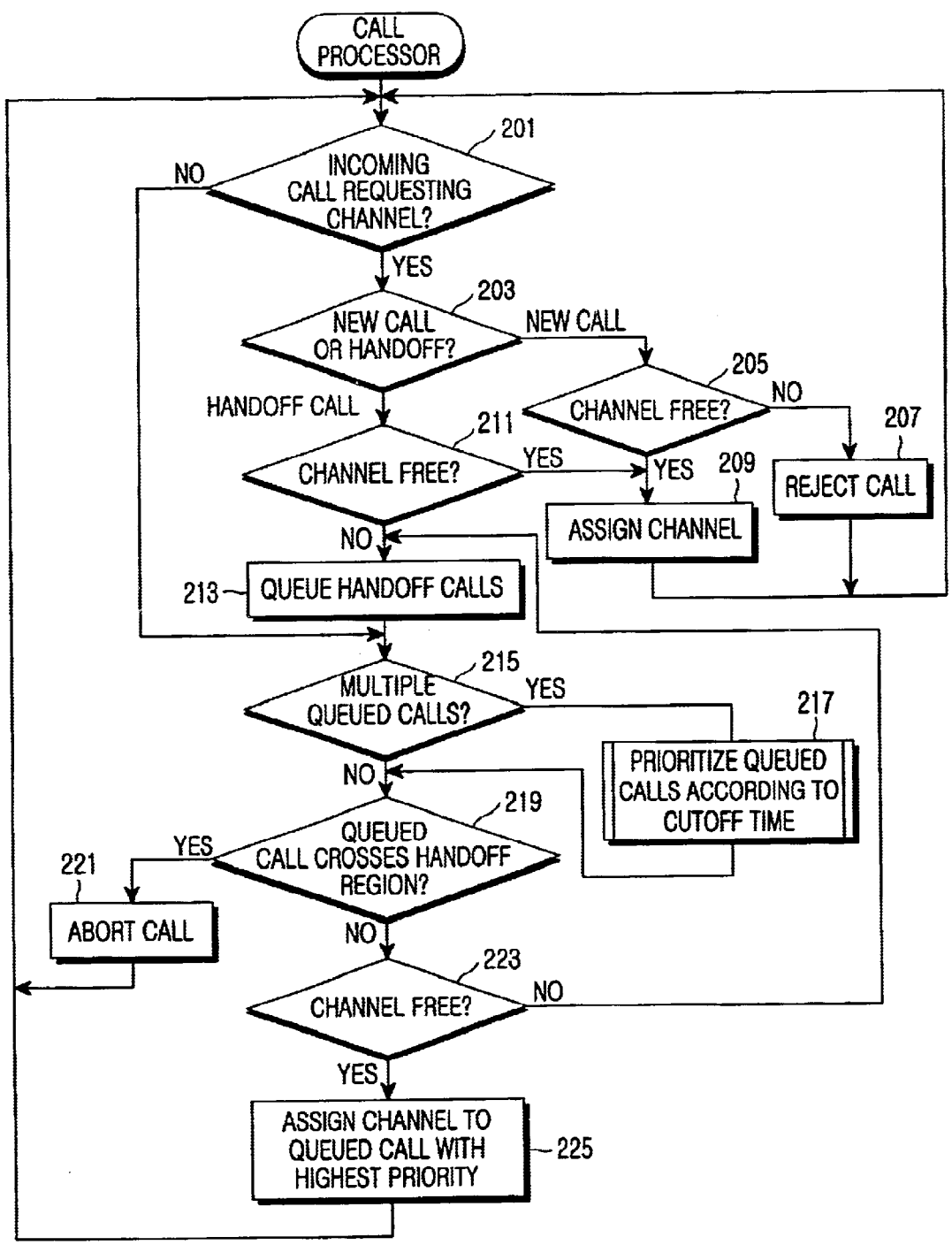
FIG. 2 is a flowchart illustrating a typical handoff call process in a base station upon a mobile channel assignment request.
Figure 3:
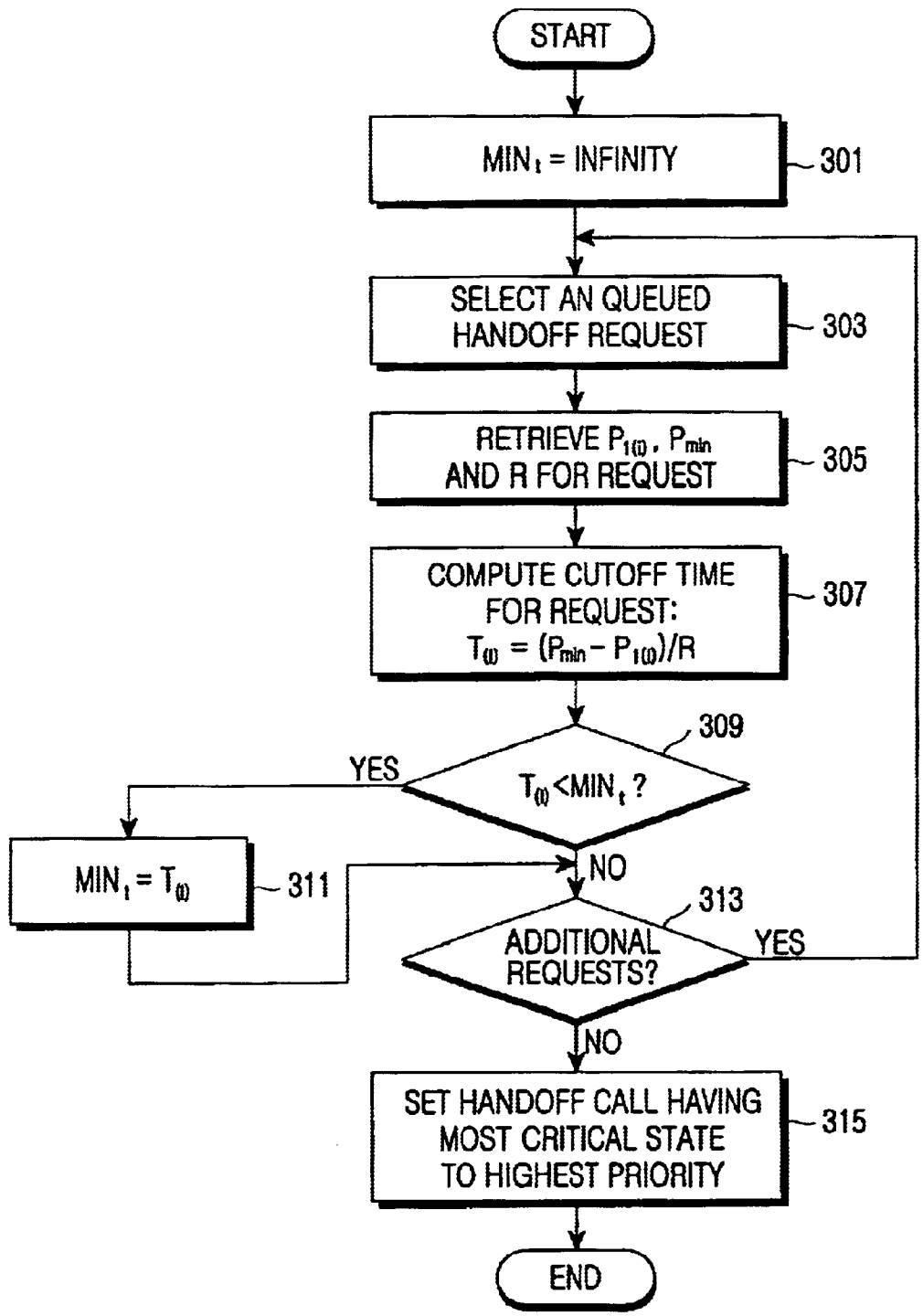
FIG. 3 is a flowchart illustrating a conventional method of prioritizing handoff requests.

A preferred embodiment of the present invention will be described in detail with reference to the attached drawings. Particular details of procedures are presented for better understanding of the present invention. The call process in a base station for channel assignment upon a mobile channel assignment request is well-known in the art. Therefore, the structure of the system and reference numerals shown in FIG. 1 and the call process for channel assignment also apply to the following description of the present invention.

In the method of prioritizing queued handoff requests according to the present invention, the channel capacity of a call and service characteristics, as well as cutoff time, are considered as parameters. Accordingly, channel assignment is determined by the parameters of cutoff time, channel capacity, and service type. Here, service type involves service name and required service quality. In the preferred embodiment, even if there is a certain handoff call having the smallest cutoff time, a channel can be first assigned to another handoff call requiring a larger channel capacity and related with a particular service type.

The three parameters which determine the handoff request, i.e., cutoff time, channel capacity, and service type, will be described with reference to FIG. 4.

Figure 4:
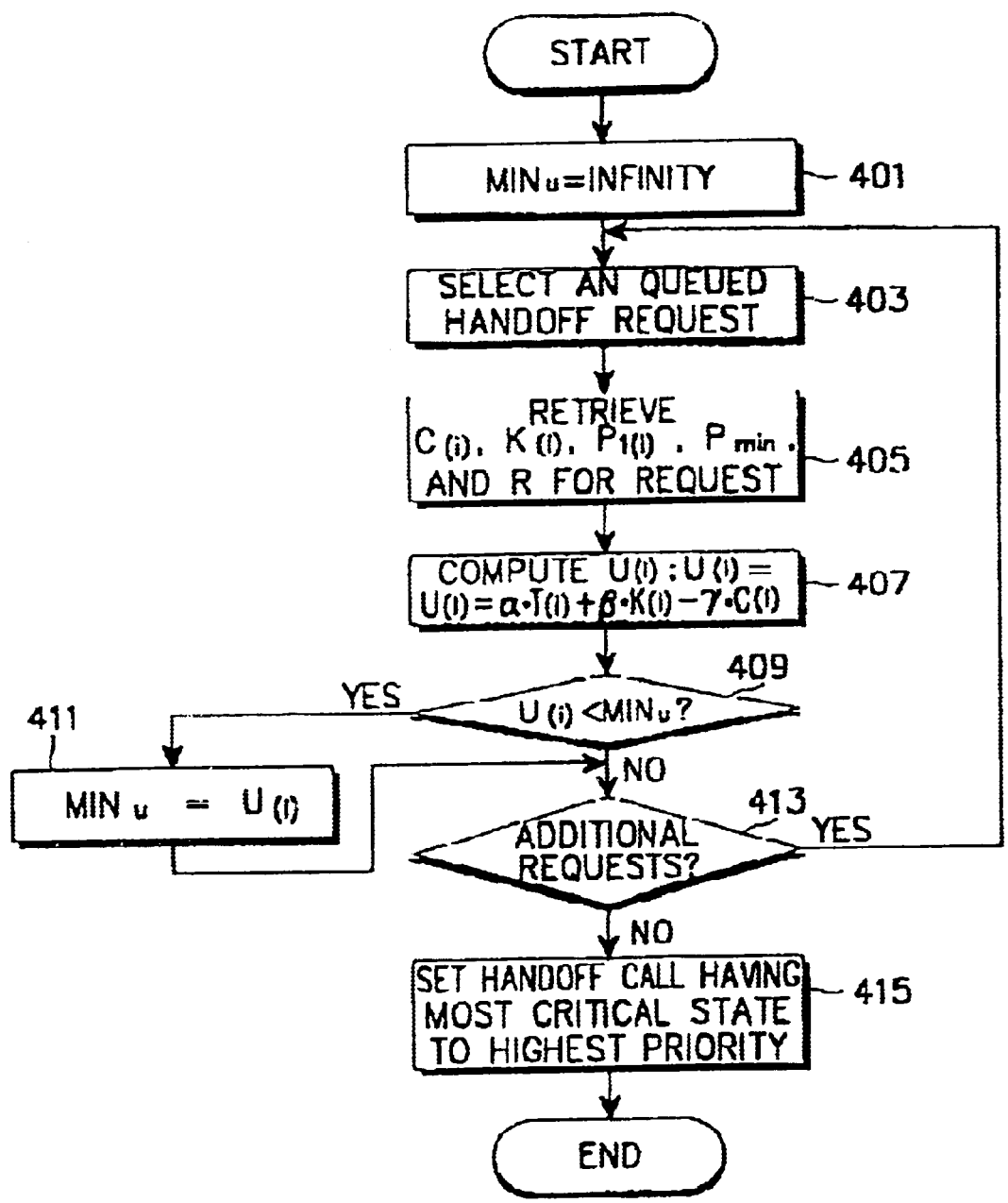
FIG. 4 is a flowchart illustrating a method of prioritizing handoff requests according to an embodiment of the present invention.

FIG. 4 is a flowchart depicting a method of prioritizing handoff requests according to an embodiment of the present invention.

The minimum service margin MIN$_u$ is set to an initial value which is infinity (step 401). Next, the base station 100 selects one of the queued handoff requests for which the service margin will first be determined (step 403).

The processor 140 retrieves $P_{min}$, $P_t(i)$, R, C(i), and k(i) for the selected queued handoff request from the memory 145 (step 405). C(i) represents the number of required channels for a mobile station i and k(i) represents a parameter set according to the service type (e.g., voice, data, video, etc.) supported by the mobile station i.

Then, the processor 140 calculates the cutoff time T(i) using the values $P_{min}$, $P_t(i)$, and R as part of step 407. The cutoff time T(i) for the mobile station i is calculated by $$T(i)=(P_{min}-P_t(i))/R \qquad (3)$$

where T(i) is the cutoff time for a mobile station i; $P_{min}$ is the cutoff threshold power, $P_t(i)$ is the current power level detected by the mobile station i and transmitted to a base station, and R is the rate of change of power level for the mobile station i, given by $$dP_t(i)/dt \qquad (4)$$

According to the present invention, the second part of step 407 is the computation of the service margin U(i) for a handoff call, which is computed according to the following formula:

$$U(i)=\alpha \cdot T(i)+\beta \cdot k(i)-\gamma \cdot C(i) \qquad (5)$$

where $\alpha$ is a weighted coefficient for the cutoff time, $\beta$ is a weighted coefficient for the service type, and $\gamma$ is a weighted coefficient for the channel capacity. Here, $\alpha$, $\beta$ and $\gamma$ are assumed to be real positive numbers. These weighted coefficients can be adjusted when necessary. Service priority is inversely proportional to the service margin, that is, the call with the lowest service margin is the call with the highest priority and is served the first. Therefore, in Eq.5, the positive sign (+) means that the priority is inversely proportional to T(i) and k(i), and the negative sign (−) means that the priority is proportional to C(i). That is, in calculating the service margin U(i), the priority increases with smaller cutoff time and lesser service type value, and increases with more required channels. However, the sign of one or more of these may be reversed in order to meet special service needs. (In particular, C(i) might be applied the opposite way—giving higher priority to smaller channel capacity calls. The sign of k(i) may be reversed if we change how we define k(i)—low for critical service or high for critical service. The sign of T(i) will not change).

More specifically, the weighted coefficients $\alpha$, $\beta$, and $\gamma$ are determined prior to prioritizing the handoff requests with use of cutoff time, channel capacity, and service type, to assign the priorities of the parameters. For example, the service type value k(i) can be determined according to the significance of service associated with time limitation, safety, cost involved in service loss, and service quality. The value of k(i) should be small for services having more critical requirements in handoff performance. The value of k(i) is predetermined for a certain service. The channel capacity C(i) is obtained by determining the number of required channels for a mobile handoff call.

The following concept is introduced to prioritize the parameters C(i) and k(i) in the present invention:

(1) a channel is first assigned to a handoff call requiring a larger channel capacity. This is done to reduce handoff failures resulting from the situation where the channel assignments for calls requiring smaller channel capacity prevent channel assignments for calls requiring larger channel capacity; and (2) the handoff priority is controlled depending on service type.

Among the parameters of the service margin U(i) in Eq.5, only the cutoff time T(i) is variable, and the other parameters are fixed during a call or service session of mobile operation once they have been determined.

Among the three parameters, namely, channel capacity, service type, and cutoff time, either channel capacity or service type alone can be considered as a parameter for determining the handoff call priority. Or channel capacity and cutoff time or service type and cutoff time in combination can be a parameter for determining the handoff call priority. In the preferred embodiment of the present invention, all three parameters are considered in prioritizing handoff requests which are placed in a queue.

The processor 140 compares U(i) with $MIN_u$ (step 409). If U(i)<$MIN_u$, $MIN_u$ is set to U(i) and the corresponding value of i for which U(i)=$MIN_u$ is stored (step 411). Otherwise, it is determined whether there are any other queued handoff requests (step 413). If there are additional queued handoff requests, steps 403–411 are repeated. If there are no more queued handoff requests, the processor 140 sets the handoff call of the mobile station having the most critical state to the highest priority (step 415). This means that the highest priority is given to a handoff call having the smallest service margin U(i) among the queued handoff requests. This corresponds to the handoff request of the mobile station with U(i)=$MIN_u$. When a channel becomes available, the mobile station having the call with the lowest U(i) is assigned the channel.

To summarize the handoff call process in the present invention, if a handoff request occurs as a mobile station enters a new cell from an old adjacent cell, it is determined whether there are any free channels. If a free channel exists, the mobile station is assigned the free channel. If there are no free channels, the handoff request is queued. When a channel becomes available, the channel will be assigned to a queued handoff request. The queued handoff requests are prioritized according to the following procedure in the present invention.

Weighted coefficients are preset for the parameters T(i), C(i), and k(i). In the case where C(i) is considered to be the primary factor, when a channel becomes available, the handoff call requiring the greatest channel capacity is assigned the channel. If there are handoff calls having the same required channel capacity, U(i) is calculated for each handoff call by [α·T(i)+β·k(i)]. Then, the channel is assigned to the handoff call having the higher priority, that is, the smaller U(i) of the two.

In the case where the three parameters are considered, U(i) is calculated by Eq. 5 using preset values of α, β, and γ and determined values of T(i), k(i), and C(i) for each queued handoff request and the next free channel is assigned to the handoff request having the smallest U(i).

In the case where k(i) is excluded from a handoff request prioritizing process, the weighted coefficient β is set to 0 in Eq.5.

Weighted coefficients can be given to T(i) and C(i) in determining a priority for each handoff request. The three priority coefficients and the value of k(i) according to service types may be varied when necessary.

As described above, the present invention is advantageous because channel assignment is implemented in consideration of complex situations, such as when multimedia services require various channel capacities. Therefore, handoff efficiency is maximized, because the three parameters of cutoff time, channel capacity, and service type are considered in prioritizing handoff requests. As a result, blocking of a high capacity service call by a low capacity service call is prevented, and handoff failure is reduced.

While the present invention has been described in detail with reference to the specific embodiment, it is a mere exemplary application. Thus, it is to be clearly understood that many variations can be made by anyone skilled in the art within the scope and spirit of the present invention.

What is claimed is:

1. A method of prioritizing queued handoff requests, prior to assigning a channel to each of said handoff requests, in a mobile communication system, the method comprising the steps of:

detecting channel capacity required by each handoff call corresponding to a respective one of said handoff requests;

prioritizing the handoff requests based on the detected channel capacity parameter requirements, by assigning a predetermined weighted coefficient to the channel capacity parameter, using said weighted coefficient and said parameter to calculate a service margin for each handoff request, and assigning a higher priority to a handoff request with a smaller service margin; and assigning a free channel to a handoff request having the highest priority.

2. The method of claim 1, wherein said prioritizing step provides a higher priority to a handoff request corresponding to a call requiring a larger channel capacity.

3. The method of claim 2, wherein said prioritizing step further prioritizes said handoff requests according to a corresponding cutoff time parameter.

4. A method of prioritizing queued handoff requests, prior to assigning a channel to each of said handoff requests, in a mobile communication system, the method comprising the steps of:

detecting a service type parameter for each handoff call corresponding to a respective one of said handoff requests;

prioritizing the handoff requests based on the service type parameter; and assigning a free channel to a handoff request having the highest priority, wherein said prioritizing step provides a higher priority to a handoff call with a higher quality service, prioritizes the handoff requests according to a corresponding cutoff time parameter, and assigns predetermined weighted coefficients to the cutoff time and service type parameters, uses said weighted coefficients and said parameters to calculate a service margin for each handoff request, and assigns a higher priority to a handoff request with a smaller service margin.

5. The method of claim 4, wherein the service margin is calculated by $$U(i)=\alpha \cdot T(i)+\beta \cdot k(i) \qquad (9)$$

where

U(i): service margin

T(i): cutoff time for a mobile station i k(i): value associated with service type supported by the mobile station i α: weighted coefficient for T(i)

β: weighted coefficient for k(i), and $$T(i)=(P_{min}-P_f(i))/R \qquad (10)$$

where $P_{min}$: cutoff threshold power;

$P_f(i)$: current power level detected by the mobile station i and transmitted to a base station R: rate of change of power level for the mobile station i, given by $$dP_f(i)/dt \qquad (11).$$

6. A method of prioritizing queued handoff requests, prior to assigning a channel to each of said handoff requests, in a mobile communication system, the method comprising the steps of:

detecting channel capacity required and service type supported by each handoff call corresponding to a respective one of said handoff requests;

prioritizing the handoff requests based on the channel capacity requirements and service types, by assigning predetermined weighted coefficients to the channel capacity and service type parameters, using said weighted coefficients and said parameters to calculate a service margin for each handoff request, and assigning a higher priority to a handoff request with a smaller service margin; and assigning a free channel to a handoff request having the highest priority.

7. The method of claim 6, wherein said prioritizing step provides a higher priority to a handoff call with a higher channel capacity requirement.

8. The method of claim 6, wherein prioritizing step provides a higher priority to a handoff call with a higher quality service.

9. The method of claim 6, wherein said detecting step also detects cutoff time, and said prioritizing step prioritizes the handoff requests based on the cutoff time.

10. The method of claim 6, wherein the service margin is calculated by $$U(i)=\beta^*k(i)-\gamma^*C(i)$$

where

U(i): service margin k(i): value associated with service type supported by the mobile station i C(i): channel capacity required by a handoff call of the mobile station i β: weighted coefficient for k(i)

γ: weighted coefficient for C(i).

11. The method of claim 10, wherein the step of prioritizing includes the step of changing the weighted coefficients of the service type and channel capacity parameters.

12. A method of prioritizing queued handoff requests, prior to assigning a channel to each of said handoff requests, in a mobile communication system, the method comprising the steps of:

assigning weighted coefficients to cutoff time, channel capacity, and service type parameters associated with each of said handoff requests;

detecting cutoff time, channel capacity requirement, and service type for each handoff call corresponding to respective one of said handoff requests;

prioritizing the handoff requests based on the weighted coefficients and the cutoff time, channel capacity, and service type parameters; and assigning a free channel to a handoff request having the highest priority.

13. The method of claim 12, wherein the step of prioritizing provides a higher priority to a handoff request with a smaller service margin calculated by $$U(i)=\alpha \cdot T(i)+\beta \cdot k(i)-\gamma \cdot C(i) \qquad (15)$$

where

U(i): service margin

T(i): cutoff time for a mobile station i k(i): value associated with service type supported by the mobile station i C(i): channel capacity required by a handoff call of the mobile station i α: weighted coefficient for T(i)

β: weighted coefficient for k(i)

γ: weighted coefficient for C(i), and $$T(i)=(P_{min}-P_f(i))/R \qquad (16)$$

where $P_{min}$: cutoff threshold power;

$P_f(i)$: current power level detected by the mobile station i and transmitted to a base station R: rate of change of power level for the mobile station i, given by $$dP_f(i)/dt \qquad (17).$$

14. The method of claim 13, wherein said prioritizing step provides a higher priority to a handoff request corresponding to a call requiring a larger channel capacity.

15. The method of claim 13, where said prioritizing step provides a higher priority to a handoff call with a higher quality service.

16. The method of claim 13, wherein said prioritizing step provides a higher priority to a handoff call with a smaller cutoff time.

17. The method of claim 13, wherein the step of prioritizing includes the steps of changing the weighted coefficients of the cutoff time, service type, and channel capacity parameters.

18. The method of claim 17, wherein when a weighted coefficient is zero, the corresponding parameter with the weighted coefficient equal to zero is not applied in said prioritizing step.

* * * * *